L. M. WAITE AND F. C. LOOMIS.
FINISHING TOOL FOR SCREW MACHINES.
APPLICATION FILED FEB. 2, 1920.
1,412,431.
Patented Apr. 11, 1922.
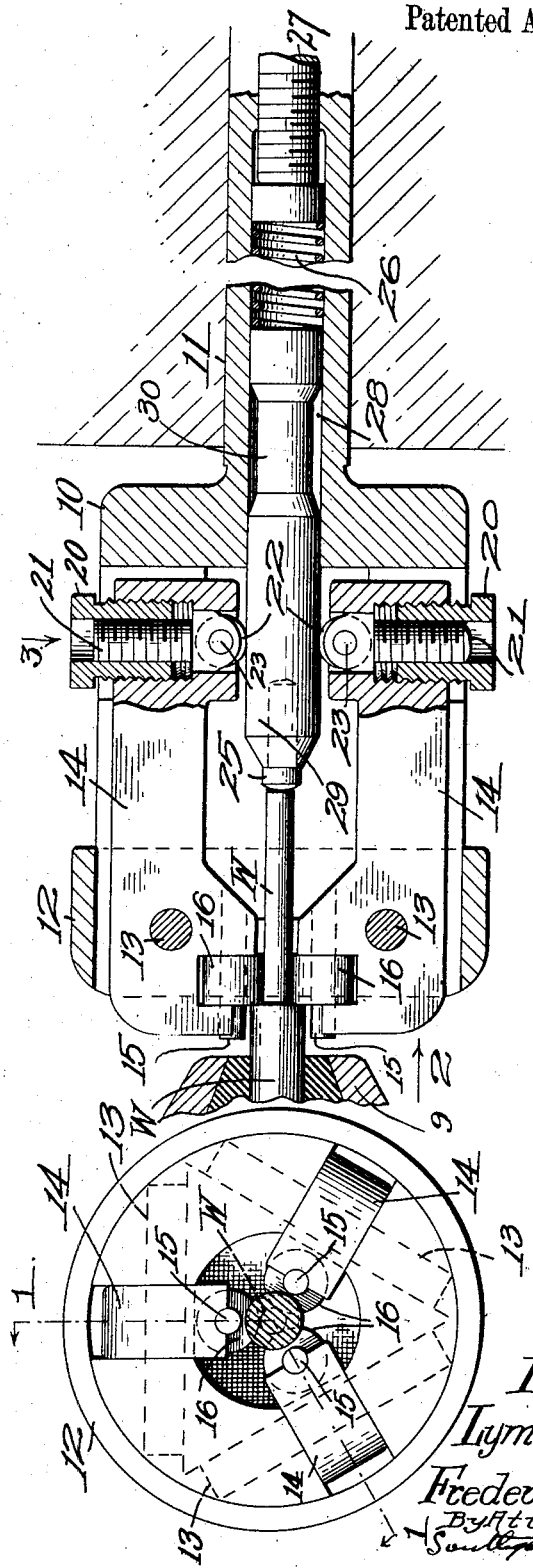
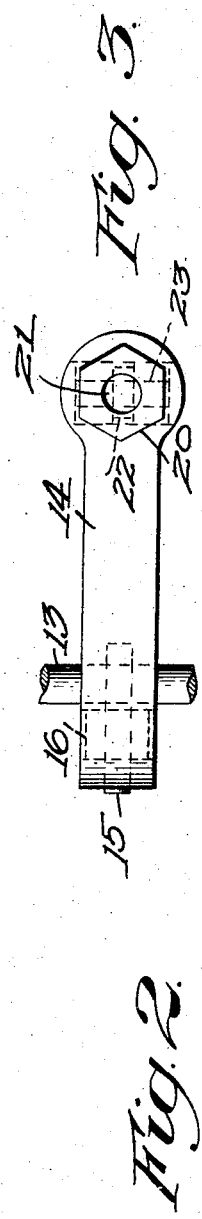
Inventors.
Lyman M. Waite.
Frederic C. Loomis.
By Attorneys.

UNITED STATES PATENT OFFICE.

FREDERIC C. LOOMIS AND LYMAN M. WAITE, OF FITCHBURG, MASSACHUSETTS, ASSIGNORS TO P-W-V AUTOMATIC MACHINE CORPORATION, A CORPORATION OF MASSACHUSETTS.

FINISHING TOOL FOR SCREW MACHINES.

1,412,431.  Specification of Letters Patent.  Patented Apr. 11, 1922.

Application filed February 2, 1920. Serial No. 355,822.

*To all whom it may concern:*

Be it known that we, FREDERIC C. LOOMIS and LYMAN M. WAITE, citizens of the United States, residing at Fitchburg, in the county of Worcester and State of Massachusetts, have invented a new and useful Finishing Tool for Screw Machines, of which the following is a specification.

This invention relates to a screw machine tool. The principal objects thereof are to provide a screw machine with an improved tool for reducing and finishing the shank of a screw or the like; to provide means whereby such a shank can be reduced to the required dimensions within a fine degree of adjustment, and one in which the finished surface will be left in a more smooth and accurate condition than has been the case with the usual cutting finishing devices for this type of machine; also to provide an improved way of operating on the finished surface and adjusting the extent of reduction thereof; and to provide means operated by the work itself for controlling the same. The invention also involves improvements in details of construction and combinations of parts as will appear.

Reference is to be had to the accompanying drawings, in which—

Fig. 1 is a sectional view on the line 1—1 of Fig. 2 of a screw machine tool constructed in accordance with this invention;

Fig. 2 is a front elevation of the same, and

Fig. 3 is a plan of one of the jaws.

Although we have not shown the complete screw machine, or illustrated the relation of this invention to the elements thereof, it may be stated that the tool which is illustrated herein is provided with a body 10 and a shank 11 by which it is mounted in stationary position on the tool head of the screw machine. The work W is held in the usual way in a chuck 9 on the spindle and rotated as it is presented to the tool shown herein so as to be forced inwardly to the extreme position shown in Fig. 1. The work rotates while the tool is held in non-rotating position and is moved forward and backward longitudinally.

The body 10 is cut longitudinally into three parts, provided with a ring 12, shrunk on to hold the three arms, which in the present form, have three pivots 13. On each of these is pivoted a jaw 14. Each jaw is provided with a fixed shaft 15, the axis of which is normally parallel with the axis of the shank 11. On each shaft 15 is mounted a roller 16 which is adapted to rotate freely and preferably provided with a cylindrical surface. These rollers are made of hardened steel and constitute the metal working elements of the tool. In the form shown, there are three of these rollers arranged around the work and adapted to operate on its cylindrical surface as will appear.

Each jaw 14 is provided at the rear thereof with a screw 20 which is internally threaded and carries inside it another screw 21 having a roll 22 journalled therein on a shaft 23 carried by the screw 21. By manipulating the screw 20 the position of the roll 22 with respect to the jaw can be regulated to any desired degree.

For operating these jaws and forcing the rollers 16 inwardly, we have provided a floating center 25. The end of this center is adapted to be engaged by the end of the work and pushed inwardly against the resistance of a spring 26 which is adapted to be adjusted by a screw 27 at the end. This center works in a central passage 28 in the shank 11. It is provided with a cam surface 29 for engaging the rolls 22 and forcing them outwardly when the parts are in the position shown in Fig. 1. But when the work is not in position, the spring 26 forces the floating center to the left in the drawing until a depression 30 in the floating center registers with the rolls 22.

In that case, the pressure on the jaws is relieved and the jaws are capable of turning to open position for the purpose of clearance in admitting the work or releasing it.

The operation of the device is as follows:—With no work in the head the floating center remains at its extreme left-hand position, the rolls 22 being in the depression 30, and the rollers 16 not being pressed toward each other. They constitute in this condition a passage of a flaring nature for the entrance of the small end of the work W. This is forced in the usual way by the longitudinal motion of the rotating chuck 9 inwardly and when it engages the end of the center 25, it commences to push it back against the spring. The parts are so adjusted that when the portion of the shank of the work W that it is desired to reduce comes into registration with the rollers 16, the rolls 22 will have passed up the incline between the depression 30 and the surface 29 and will then rest on the surface 29. This forces the rollers 16 positively inwardly against the shank of the screw blank or other work W. This is forced inwardly further as the work advances and the compression continues throughout the motion in that direction to reduce the blank by a rolling motion on the circumference of the work. When the work reaches the position shown in Fig. 1, it is withdrawn and the rollers 16 continue to act upon it to further finish the surface until the rolls 22 again pass down the incline on the controlling cam 29. It will be understood that this floating center and its cam 29 will follow the work out on account of the action of the spring 26. As soon as the jaws swing apart, the work is free to be fully withdrawn without further action upon it.

It is found in practice that the rolling action performs a very satisfactory finishing and reducing operation upon the blank. It can be reduced to the desired dimension within half of a thousandth of an inch very readily and the surface is a great deal smoother than it can be made with any cutting tool without a special finishing operation. This is an important improvement in the art of making screws, and screw machine products especially because the operation can be performed with more rapidity than with a finishing operation, and with greater production within limits of accuracy, and the results are more easily and constantly obtained.

Although we have illustrated and described only a single form of the invention and described it as being applied only to a screw machine, we are aware of the fact that modifications can be made in the details of construction and also that instead of rotating the work the tool may be rotated without departing from the scope of the invention as expressed in the claims.

Therefore, we do not wish to be limited to all the details of construction herein shown and described, but what we do claim is:—

1. In a tool for a screw machine, the combination of a floating center therein having its end in position to be engaged by the work and having a cam surface, a set of jaws arranged around said center, a roller freely rotatable on each jaw, and adjustable means on said jaws for engaging said cam surface and forcing said rollers simultaneously toward the axis of the tool to a position to reduce and finish the surface of the work.

2. In a tool for a screw machine, the combination of a movable center therein having a cam surface circular in cross section, a spring for forcing said center outwardly, a set of jaws pivotally mounted on said tool and arranged in a concentric series around said center, a roller freely rotatable in each jaw, and adjustable means on said jaws back of their pivots for engaging said cam surface and forcing said jaws simultaneously toward the center to reduce and finish a blank located in position to force said center back.

3. In a tool for a screw machine, the combination of a longitudinally movable floating center therein having its end in position to be engaged by the work when inserted in the tool and having a cam surface circular in cross section, means for yieldingly forcing said center axially outwardly, a set of jaws pivotally mounted on said tool and arranged in a concentric series around said center but extending beyond it, a roller freely rotatable on each jaw at the front of said center and having a cylindrical surface, the axes of said rollers being substantially parallel with the axis of said center, and adjustable means on said jaws back of their pivots for engaging said cam surface and forcing said jaws simultaneously toward the center to reduce and finish a blank located in position in said tool.

4. The combination in a tool, of a movable center therein having a cam surface, a set of jaws pivotally mounted on said tool and arranged in a concentric series around said center, a roller freely rotatable on each jaw, a screw on each jaw and a roll carried by each screw and adapted to engage the cam surface to force said jaws toward the center.

5. The combination in a tool, of a floating center therein having its end in position to be engaged by the work when inserted in the tool, and having a cam surface provided with a circular depression, means for yieldingly forcing said center outwardly, a set of jaws mounted on said head and arranged around said center but extending beyond it, a roller mounted on each jaw at the front of said center and having cylindrical surfaces the axes of which are substantially parallel with the axis of said center, and adjustable means on said jaws for engaging said cam surface and forcing said jaws simultaneously toward the center to reduce and finish a blank located in position in the tool to force said center back, said circular depression being in position to register with the last named means when there is no work in the head, and thereby allow the jaws to open.

6. The combination in a rotary tool, of a set of jaws mounted on said tool, a metal reducing roller mounted on each jaw to rotate on axes parallel to the axis of rotation of the tool and having a cylindrical surface, and radially adjustable means on said jaws by which said jaws can be forced simultaneously toward the center to reduce and finish a blank located in position in the tool, with means inside the tool acting on said radially adjustable means for moving them inward simultaneously the tool and work being relatively rotatable and the rollers being rotatable on their own axes by frictional contact with the work.

In testimony whereof we have hereunto affixed our signatures.

FREDERIC C. LOOMIS.
LYMAN M. WAITE.